United States Patent [19]

Gazda

[11] 4,235,612
[45] Nov. 25, 1980

[54] DEVICE FOR SEPARATING GASEOUS MIXTURES

[76] Inventor: Hans O. E. Gazda, Anton Kriegergasse 155, A-1238 Wien, Austria

[21] Appl. No.: 887,360

[22] Filed: Mar. 16, 1978

[51] Int. Cl.² .............................................. B01D 59/20
[52] U.S. Cl. ...................... 55/403; 55/394; 55/407; 55/409; 55/17; 233/DIG. 1
[58] Field of Search ................ 55/17, 400, 401, 403, 55/406–409, 472, DIG. 14, 394; 233/17, 18, DIG. 1; 423/DIG. 7

[56] References Cited

U.S. PATENT DOCUMENTS

| | | | |
|---|---|---|---|
| 3,486,314 | 12/1969 | Herrington | 55/408 |
| 4,007,007 | 2/1977 | Gazda | 426/237 |
| 4,008,135 | 2/1977 | Gazda | 210/380 R |
| 4,033,021 | 7/1977 | Tybus et al. | 55/17 |

FOREIGN PATENT DOCUMENTS

| | | | |
|---|---|---|---|
| 73657 | 9/1916 | Austria | 55/407 |
| 238697 | 7/1964 | Austria . | |
| 1205830 | 2/1960 | France | 55/17 |
| 1230416 | 9/1960 | France | 423/DIG. 7 |
| 20720 | 11/1967 | Japan | 55/407 |
| 6902586 | 8/1970 | Netherlands | 55/17 |
| 239215 | 7/1969 | U.S.S.R. | 55/403 |

*Primary Examiner*—David L. Lacey
*Attorney, Agent, or Firm*—Karl F. Ross

[57] ABSTRACT

An apparatus for the separating of isotope fractions, especially for the concentration of uranium 238 and uranium 235, which comprises a plurality of disks rotatable about a common axis and having central supply regions at which gas mixtures can be introduced. Outwardly from these supply regions, each disk is formed with a radial passage communicating with a chamber and opening into the latter through a constriction. Light fractions are removed from the edges of the gas flow radially through the chamber while a heavy fraction is passed centrally through at least one further constriction and into another chamber. The light fractions from one disk are fed to the supply region of another disk while the heavy fractions can be collected and fed to the supply region of still a third disk. Alternatively, or in addition, the light fraction delivery channels and the heavy fraction delivery channels for at least two disks are interconnected.

4 Claims, 5 Drawing Figures

DEVICE FOR SEPARATING GASEOUS MIXTURES

BACKGROUND OF THE INVENTION

Various methods are known for separating or concentrating gas mixtures, in particular isotope mixtures.

In practice, to obtain concentrations of U 235 from a uranium isotope mixture, the principal method is the diffusion technique. The so-called gas-centrifuge technique and separating nozzle technique have also been used. In all three methods, because of the low separating effect or the low throughput, a large number of separating stages must be provided in cascade in order to achieve the necessary concentration. Furthermore these methods have disadvantageously high energy consumption and high investment costs.

Austrian patent No. 238 697 describes an apparatus for separating or concentrating gas mixtures. This apparatus comprises a disc rotating at high speed and having an annular supply or feed region for the mixture extending radially, this region communicating with at least one nozzle orifice extending radially of an annular nozzle and adjoining the nozzle orifice approximately in the plane of the nozzle orifice. The supply region comprises a delivery pipe for the heavy fraction of the mixture and on both sides of the nozzle orifice, delivery pipes for the light fraction of the mixture. However, in practice, this apparatus has not proved successful in isotope, particularly uranium isotope separation.

Object of the Invention

It is the object of the invention to provide an improved apparatus which is particularly suitable for uranium isotope separation or concentration.

Summary of the Invention

This object of the invention is achied disposing several discs substantially parallel to each other to be driven by a common shaft. The discs are preferably located under a vacuum bell jar with a vacuum of at most 150, preferably between 1 to 15 Torr.

In an embodiment of the invention the delivery channels for the light fraction and/or heavy fraction of the mixture from several discs are interconnected.

According to another feature of the invention a delivery channel of at least one disc is connected to the inlet of the supply region of another disc.

Preferably, the vicinity of the outer edge of the rotating disc is a region in which the gaseous mixture leaves the disc with the formation of eddies, delivery devices being provided for discharge of the mixture from the central region and from a peripheral region of the eddies, independently.

When a space free from flow restrictions exists along the outer circumference of the disc, the mixture leaving in the radial direction is set in turbulence at the edge of the disc. The light fraction accumulates in the central region of such turbulence while the heavy fraction preferentially accumulates in the outer circumferential area of the turbulence.

According to the invention, a concentration results from this formation of turbulence. Under certain circumstances, a concentration of either fraction or separation of the two fractions can be achieved solely on the basis of this formation of turbulence, i.e. without providing radial nozzle inside the discs.

In the apparatus according to the invention, internal cascading is effected by disposing several separating nozzles one behind the other per disc. The centrifugal forces serve for compression and not the actual separation. A radial pressure drop of approximately 4,000:1 prevails, i.e. the pressure drops across the disk to 1/4000ths of the pressure at the inlet to the disc space. An apparatus according to the invention, which maintains these pressure differences between the center and periphery, achieves a basic separating effect (separation factor) of 1.07 for the uranium isotope separation. With a nozzle orifice width of 0.2 mm and a nozzle ring diameter of 200 mm, a throughput of approximately 10 liters uranium hexafluoride gas per second is achieved. This means that a cascade of 22 centrifuges produces an annual yield of 57 metric tons of U 235 enriched by 3%. For 1 kg of enriched material, only 9 KWH current are required in contrast to 300 KWH in the gas centrifuge. An installation which operates with an apparatus according to the invention is economically viable with an annual separating capacity of 100 metric tons enriched U 235.

The separating effect is achieved according to the invention by the complicated alternating action of separating nozzles inside the disc, the formation of turbulence along the periphery of the disc, formation of turbulence in the stationary container, rotation of the gas in the free space between the disc and container and shock waves in this space.

Brief Description of the Drawing

The invention will now be described in detail with reference to the drawing. In the drawing.

Specific Description

Figure 1:
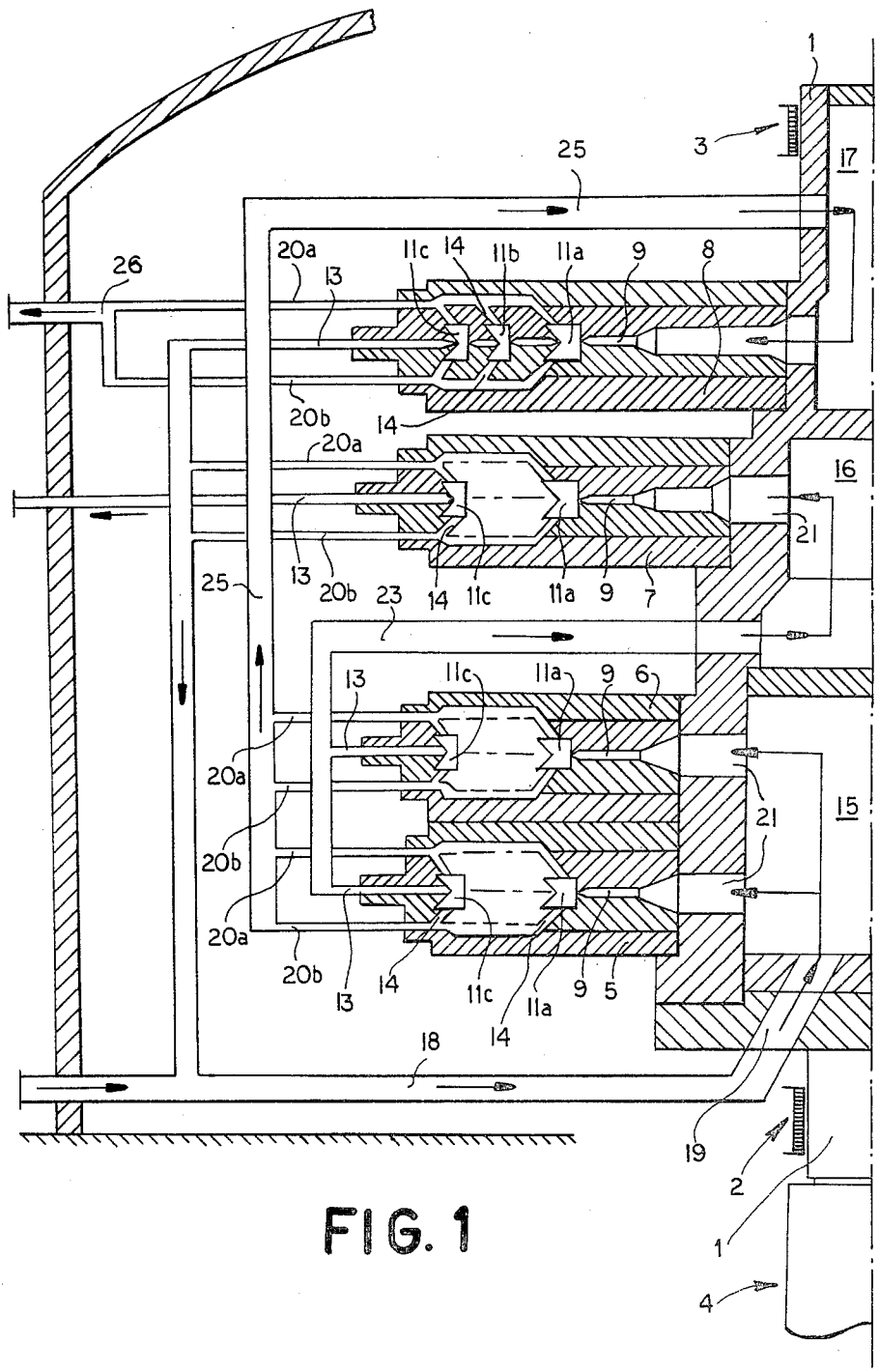
FIG. 1 is a diagrammatic axial section through half of an apparatus according to the invention.
Figure 2:
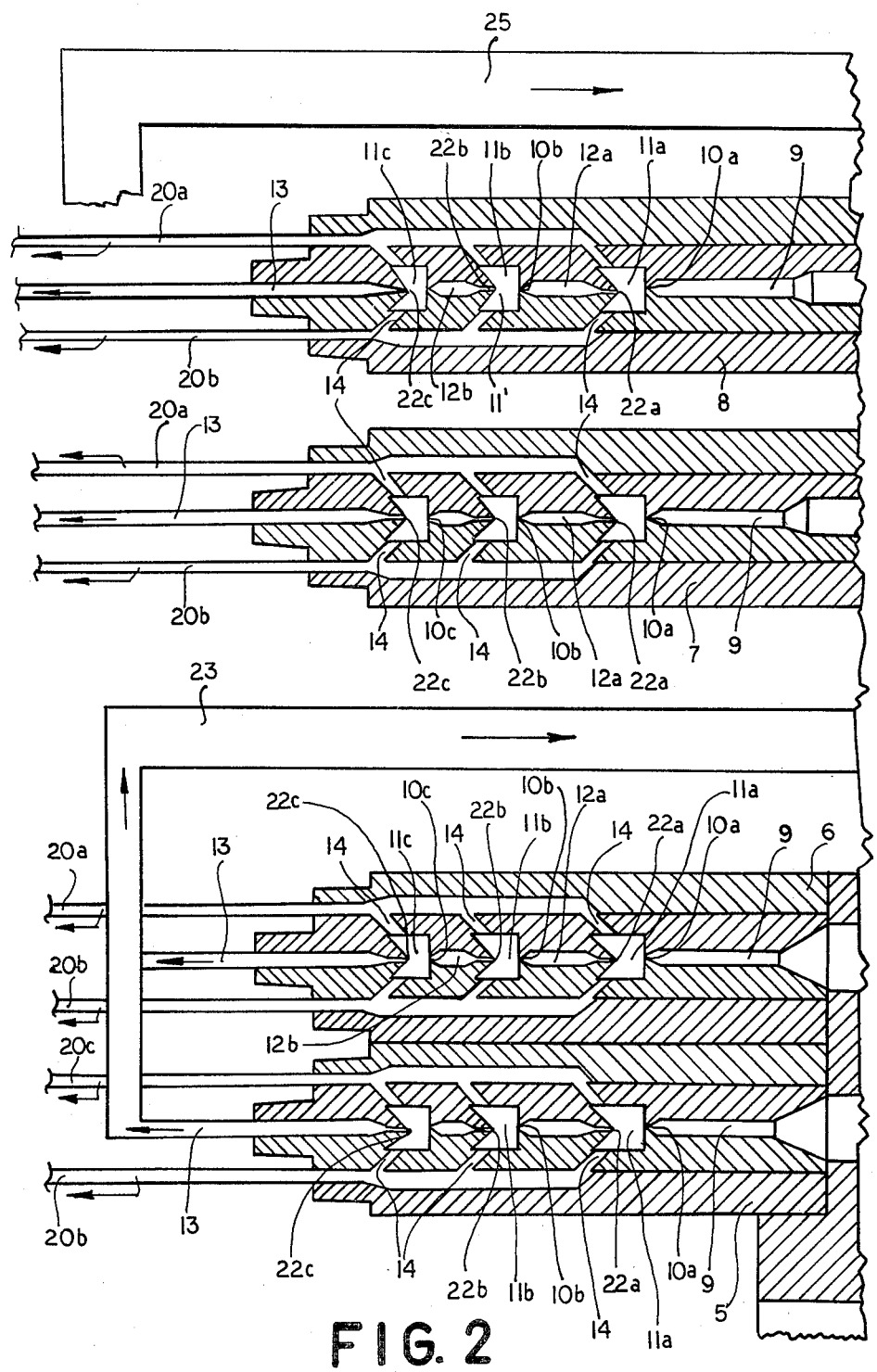
FIG. 2 shows parts of the view of FIG. 1, to an enlarged scale.

The apparatus according to the drawings comprises a shaft 1 mounted in bearings 2 and 3, which shaft can be driven at high speed by a drive 4. Several discs, 5, 6, 7 and 8 are attached to the shaft 1. Each disc 5 to 8 comprises an annular supply region 9, which opens through a nozzle orifice (construction) 10a into an annular chamber 11a. Approximately in the plane of the nozzle orifice 10a, the chamber 11a comprises an outlet pipe 12a, which is firstly enlarged radially and opens by way of a further nozzle orifice 10b into a chamber 11b. Adjoining this chamber 11b in a similar manner is a further outlet pipe 12b and a further chamber 11c. The last chamber 11c opens into a delivery pipe 13. Each chamber 11a to 11c has on its outer wall, a V-shaped cross section and on both sides of the nozzle orifice, a delivery pipe 14 respectively, which is connected to collecting pipe 20. The shaft 1 is constructed to be partly hollow and comprises three chambers 15, 16 and 17. The chamber 15 comprises two outlet pipes 21 extending radially, which open into the supply region 9 of the two discs 5 and 6. The original mixture is supplied to the chamber 15 by way of a pipe 18 and an annular bore 19, possibly through a stationary ring (not shown). Due to the centrifugal forces occuring upon rotation of the discs 5 to 8, the original mixture is supplied through the pipes 21 and supply regions 9 to the nozzle orifice 10a. Directly thereafter, the mixture enters the chamber 11a, which has a V-shaped cross section with an outlet nozzle 22a on the outer wall. The actual separation of the two fractions takes place between the outlet nozzle 22a and the V-shaped wall acting as a separator. Thus, the light fraction is urged outwards into the delivery pipes 14, whereas the heavy fraction passes through the outlet nozzle 22a. The separating process is repeated in the same manner in both subseqeunt annular chambers 11b and 11c. The delivery pipes 13 for the heavy fraction communicate via a common collecting pipe 23 with the chamber 16 of the shaft 1. From the latter the mixture is passed in a similar manner through the disc 7. Thus, the heavy fraction is conveyed outwardly through the delivery pipe 13 of the disc while the light fraction in the delivery pipes 14 of the disc is led by way of the pipes 20a and 20b and a collecting pipe 25 to the next stage. An optimum utilization of the original mixture is thus achieved.

The delivery pipes 20a and 20b for the light fraction are connected by way of a collecting pipe 25 to the chamber 17 of the shaft 1 and from the latter to the individual nozzle orifices 10a–10c and annular chambers 11a–11c of the disc 8. The light fraction of the mixture is conveyed outwards by the delivery pipes 20a and 20b of the disc 8 by way of a collecting pipe 26. The heavy fraction of the mixture leaves the apparatus according to the invention by way of the delivery pipe 13 of the disc 7.

Figure 3:
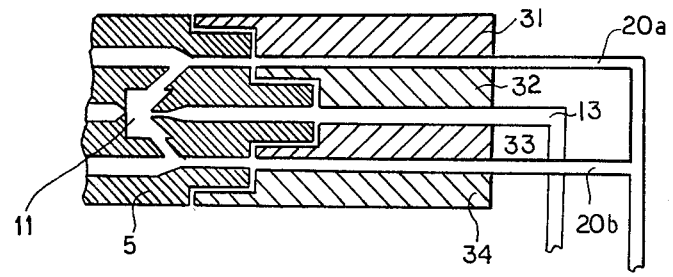
FIG. 3 is a detailed view of a disc with a removal device for the mixture.

FIG. 3 shows a removal device for the two fractions of the mixture on the outer edge of the disc 5. This removal device consists of stationary discs 31 to 34, which are supported by an outer stationary ring (not shown).

Figure 4:
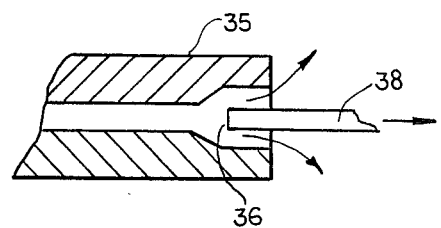
FIG. 4 is a detailed view of the peripheral region of the disc in a modified embodiment.
Figure 5:
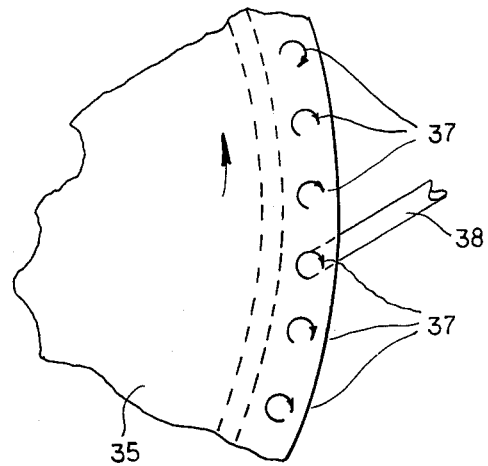
FIG. 5 is a plan view of FIG. 4.

FIGS. 4 and 5 show the outlet region of a preferred embodiment of a disc 35 according to the invention. When the mixture leaves the disc 35, it passes into the enlarged region 36 to form eddies 37. Since these eddies 37 rotate at high speed, the heavy fraction is urged outwards, so that due to a controlled removal of the mixture in the central region of the eddy, possibly by a tube 38, an additional separating or concentration effect is achieved.

What I claim is:

1. A centrifugal apparatus for the separation of a gaseous mixture into a light component and a heavy component, comprising:
   a plurality of disks connected to a common hollow shaft which is in communication with the centrifugal separator's gaseous mixture inlet and rotatable at high speed about a common axis, each of said disks having a central supply region at said axis, a radial passage extending outwardly from said supply region and including a first nozzle orifice having a constriction, a chamber radially outwardly of said first nozzle orifice and communicating therewith while being of larger cross section than said nozzle orifice, another radial passage in flow communication with said chamber opposite said nozzle orifice and including a second nozzle orifice having a constriction whereby a heavy fraction from a gas mixture is led through said second nozzle orifice, a heavy-fraction delivery passage communicating with said second chamber substantially centrally thereof, and respective light-fraction delivery passages communicating with each of the chambers of the respective disks to opposite sides of said nozzle orifices and said heavy-fraction delivery passage;
   first conduit means connected to the heavy-fraction delivery passage of one of said disks; and
   second conduit means connected to the light-fraction delivery passages of said one of said disks, one of said first and second conduit means being positioned and arranged so as to discharge the respective fraction into the supply region of another of said disks.

2. The apparatus defined in claim 1 wherein said first conduit means is positioned and arranged to discharge said heavy fraction into a supply region of said other of said disks, means being provided for recovering the heavy component from the heavy-fraction delivery passage of said other of said disks, the second conduit means being positioned and arranged to open into the supply region of yet a further one of said disks, and means being provided to collect the light component from the light-fraction delivery passages of the latter disk.

3. The apparatus defined in claim 2 wherein said first conduit means is positioned and arranged to interconnect the heavy-fraction delivery passages of a plurality of disks and said second conduit means is positioned and arranged to interconnect the light-fraction discharge passages of a plurality of disks.

4. The apparatus defined in claim 1 wherein each of said disks is formed along its periphery with an enlarged region in which rotation of the disk causes formation of eddies of the gas mixture leaving the disk, a tube being provided to collect light and heavy fractions from central and peripheral portions of said eddies, respectively.

* * * * *